(12) United States Patent
Davis

(10) Patent No.: US 11,260,967 B1
(45) Date of Patent: Mar. 1, 2022

(54) NO/LOW SKID DEVICE

(71) Applicant: James Robert Davis, Riverside, CA (US)

(72) Inventor: James Robert Davis, Riverside, CA (US)

( * ) Notice: Subject to any disclaimer, the term of this patent is extended or adjusted under 35 U.S.C. 154(b) by 0 days.

(21) Appl. No.: 16/122,144

(22) Filed: Dec. 3, 2018

Related U.S. Application Data

(60) Provisional application No. 62/597,291, filed on Dec. 11, 2017.

(51) Int. Cl.
  *B64C 25/40* (2006.01)
  *B64C 25/36* (2006.01)
  *B60B 7/00* (2006.01)

(52) U.S. Cl.
  CPC .............. *B64C 25/40* (2013.01); *B64C 25/36* (2013.01); *B60B 7/0013* (2013.01); *B60Y 2200/51* (2013.01)

(58) Field of Classification Search
  CPC ...................................................... B64C 25/40
  See application file for complete search history.

(56) References Cited

U.S. PATENT DOCUMENTS

| | | | | |
|---|---|---|---|---|
| 1,829,500 A | * | 10/1931 | Brown ..................... | B64C 25/40 244/103 S |
| 2,452,633 A | * | 11/1948 | Cautley ................... | B64C 25/40 244/103 R |
| 2,464,872 A | * | 3/1949 | Koval ...................... | B64C 25/40 244/103 S |
| 3,529,792 A | * | 9/1970 | MacMahon ............. | B64C 25/40 244/103 S |
| 4,040,582 A | * | 8/1977 | Krauss .................... | B64C 25/40 244/103 S |
| 4,383,665 A | * | 5/1983 | Maclean ................. | B64C 25/40 244/103 S |
| 4,385,739 A | * | 5/1983 | Soderberg ............. | B64C 25/405 244/103 S |
| 4,491,288 A | * | 1/1985 | Sinclair .................. | B64C 25/40 244/103 S |
| 4,615,498 A | * | 10/1986 | Ochiai .................... | B64C 25/40 244/103 S |
| 4,732,350 A | * | 3/1988 | Lamont ................... | B64C 25/40 244/103 S |
| 5,165,624 A | * | 11/1992 | Lewis, Jr ................ | B64C 25/40 244/103 S |
| 5,213,285 A | * | 5/1993 | Stanko .................... | B64C 25/40 244/103 S |
| 5,251,848 A | * | 10/1993 | Gannatal ................ | B64C 25/40 244/103 R |

(Continued)

FOREIGN PATENT DOCUMENTS

DE 102013020547 A1 * 6/2015 ............. B64C 25/40

*Primary Examiner* — Richard G Davis

(57) ABSTRACT

An aircraft hubcap/wheel cover which uses ambient airflow (120 mph-175 mph) to rotate wheels on the landing gear of an aircraft accomplished by using slightly protruding slats, blades, scoops or other air capturing shapes, (once the landing gear has been lowered). These air capturing shapes are integrated as part of the hubcap/wheel cover during manufacture and are directly determined by ground speed applicable to that aircraft with the ultimate purpose being tire longevity. The wheel cover hubcap is a single piece design and has no moving parts.

3 Claims, 2 Drawing Sheets

(56) References Cited

U.S. PATENT DOCUMENTS

| | | | | |
|---|---|---|---|---|
| 5,417,387 A * | 5/1995 | Jennings | ............... | B64C 25/40 |
| | | | | 244/103 S |
| 5,746,393 A * | 5/1998 | Gennaro | ............... | B64C 25/40 |
| | | | | 244/103 S |
| 6,032,900 A * | 3/2000 | Smith | ............... | B64C 25/40 |
| | | | | 244/103 S |
| 6,086,017 A * | 7/2000 | Al-Thani | ............... | B64C 25/405 |
| | | | | 244/103 S |
| 6,499,691 B1 * | 12/2002 | Lyons | ............... | B64C 25/40 |
| | | | | 244/103 R |
| 6,983,911 B1 * | 1/2006 | Nordquist | ............... | B64C 25/40 |
| | | | | 152/523 |
| 9,174,726 B2 * | 11/2015 | Ushiyama | ............... | B64C 25/405 |
| 2004/0065771 A1 * | 4/2004 | Snyder | ............... | B60C 13/02 |
| | | | | 244/10 |
| 2004/0123929 A1 * | 7/2004 | Han | ............... | B64C 25/40 |
| | | | | 152/523 |
| 2013/0112809 A1 * | 5/2013 | Khal | ............... | B64C 25/40 |
| | | | | 244/103 S |
| 2013/0256452 A1 * | 10/2013 | Ushiyama | ............... | B64C 25/40 |
| | | | | 244/50 |
| 2014/0048648 A1 * | 2/2014 | Karl | ............... | B64C 25/40 |
| | | | | 244/103 S |
| 2015/0021435 A1 * | 1/2015 | Abbasszadeh | ............... | B64C 25/40 |
| | | | | 244/103 S |
| 2016/0059955 A1 * | 3/2016 | Yoshida | ............... | B64C 25/40 |
| | | | | 152/523 |
| 2016/0200424 A1 * | 7/2016 | Mabie | ............... | B64C 25/40 |
| | | | | 244/103 S |
| 2017/0129594 A1 * | 5/2017 | Essinger | ............... | B64C 25/64 |
| 2017/0361925 A1 * | 12/2017 | Pao | ............... | B64C 25/40 |
| 2018/0043999 A1 * | 2/2018 | Yoshida | ............... | B60C 19/001 |

* cited by examiner

NO/LOW SKID DEVICE

CROSS REFERENCE TO RELATED APPLICATIONS

This application claims priority under 35 USC § 119(e) to U.S. Provisional Application No. 62/597,291 filed Dec. 11, 2017 the entire contents of which is herein incorporated by reference in its entirety.

BACKGROUND OF THE DISCLOSURE

Field of the Invention

This invention relates specifically to larger commercial aircraft and the tire wear thereof. The reduction of premature tire wear is the nucleus of this invention.

Description of the Related Art

Wheels of most aircraft are subjected instantaneous contact with the tarmac (runway) when landing. During this time, large billows of blue smoke from the skidding of tires is easily evident and prolific.

SUMMARY OF THE INVENTION

The specific problem of extreme tire wear during landing is addressed and can be rectified by instituting tire rotation at or near the ground speed of the aircraft involved. The result of this would be no/low skid, and/or an increase in tire longevity, and a goal of doubling the life of the tire, without avoiding safe tire parameters. The subsequent savings will be high.

The invention reduces tire skid/flat spots on aircraft when landing. By using ambient airflow when aircraft attempts to land, it initiates tire spin at or close to ground speed to reduce skidding.

Other features and aspects will be apparent from the following detailed description, the drawings, and the claims

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, products, and/or systems, described herein. However, various changes, modifications, and equivalents of the methods, products, and/or systems described herein will be apparent to an ordinary skilled artisan.

The invention addresses this with the use of a hub-cap using various air capturing shapes. These protrude from the wheel assembly and can include scoops, cups or slats, depending on RPM required and speed of aircraft when landing.

When the aircraft is about to land, wind speeds can reach 120-175 mph under the fuselage. At this point, the energy is captured by the captive design of the hub-cap and rotation of the wheel assembly starts in the direction desired. This use of energy in this fashion can be viewed when looking at a wind powered generator or an old fashioned wind-mill.

The hub-cap includes it being a circular shape and diameter corresponding to the diameter of the wheel and may be installed without any modification to the wheel.

An aircraft hubcap structure for attachment to an airplane wheel and tire assembly may have a circular configuration, and extend outwardly from said wheel with said wheel defining a plurality of bolt holes spaced from one another at or adjacent to said hubcap structure.

An embodiment of the invention includes:
1. A single pre-formed or cast hub cap;
2. protrusions/depressions to deflect airflow;
3. cast on to hub cap;
4. install hub cap on wheel.

Relationship Between the Components

Step 1 plastic, aluminum, steel, or fiber glass can be used as the material for the hub cap. Step 2 speed of aircraft during landing will determine the size and number of protrusion/depressions that are required to reduce the rate of spin needed to match as close as possible ground speed. This will eliminate and or reduce tire skid/wear. Witch would extend tire life reducing tire cost. Step 3 once the protrusions/depressions are determined, a single piece is created with no moving parts. Step 4 install hub caps on wheel.

By utilizing directed airflow, wheel spin is initiated to approximately landing speed at time of landing, eliminating or largely decreasing tire skid on runway.

Using machine dies and injection molding machines, there are no moving parts. First, it requires the inventive hub cap. Second, it requires airflow underneath the aircraft. Wind deflection shapes can be changed to many geometric possibilities to perform the same result. The invention is used by simple installation of the hub cap to wheel.

Figure 1A:
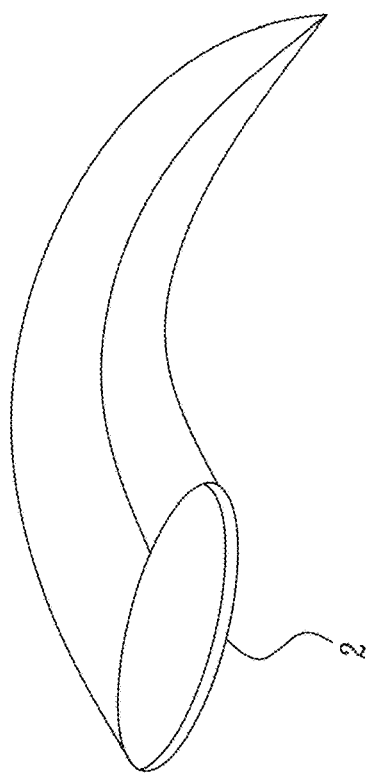
FIG. 1 shows embodiments of wheel spinning structures of the invention.
Figure 1B:
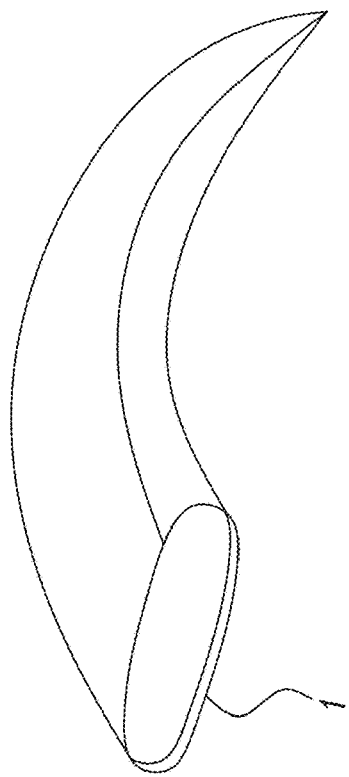
Figure 1C:
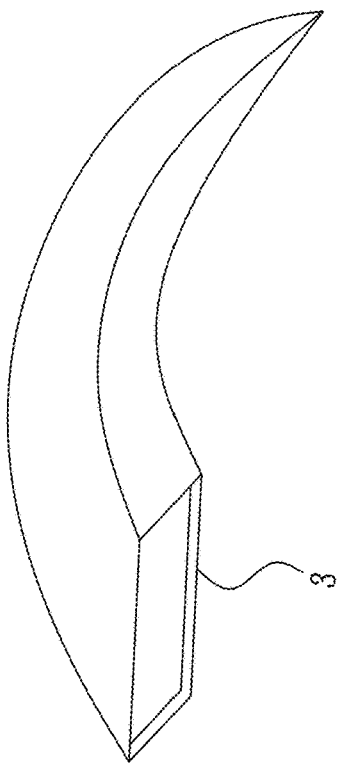

FIGS. 1A, 1B, and 1C show examples 1, 2, and 3, of various wheel spinning structures of the invention.

Figure 2:
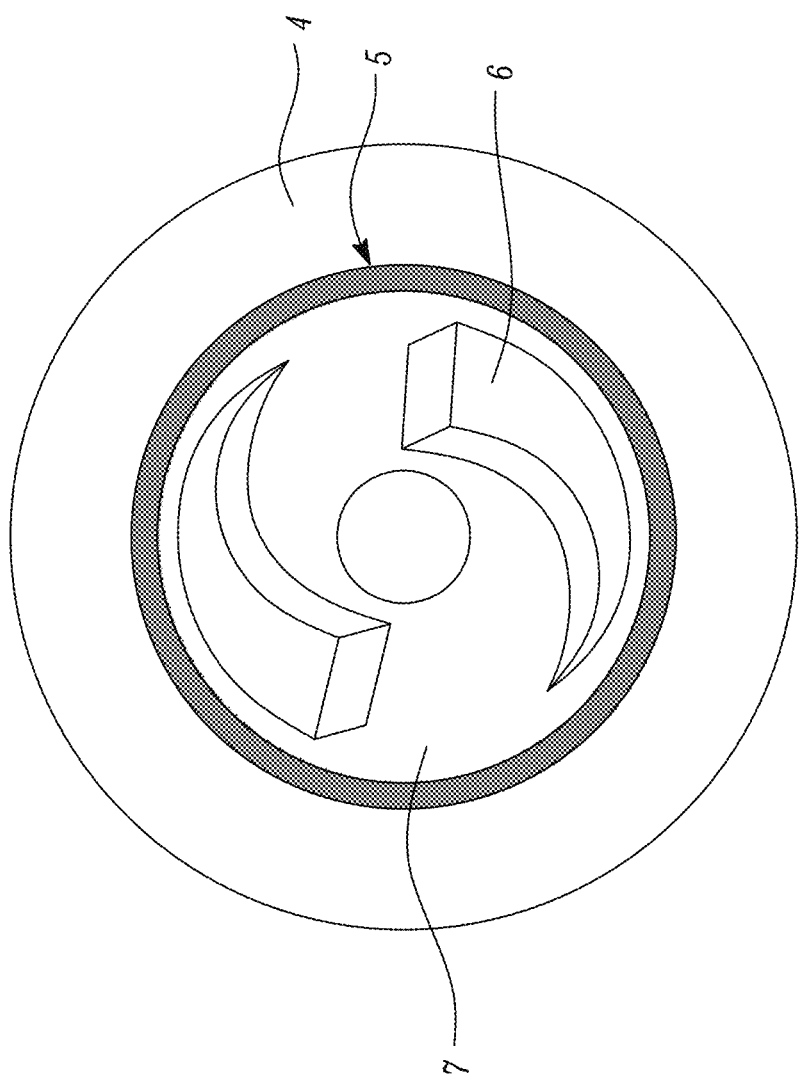
FIG. 2 shows an embodiment of a hub cap of the invention on an aircraft wheel.

FIG. 2 shows hub cap 7 on an aircraft tire 4 and rim 5 along with wheel spinning structures 6.

While this disclosure includes specific examples, it will be apparent after an understanding of the disclosure of this application has been attained that various changes in form and details may be made in these examples without departing from the spirit and scope of the claims and their equivalents.

The invention claimed is:

1. A low skid device for a wheel for an aircraft comprising:
    a hub cap configured for attachment the aircraft wheel and tire assembly; and
    an air capturing structure comprising at least one of a scoop, a cup, and a slat wherein the air capturing structure extends from between about 30% to about 50% of the circumference of the hub cap; and
    the air capturing structure comprises two ends, with an opening at one end, and a body comprising a curvilinear shape of gradually decreasing volume to a closed second end.

2. The low skid device for a wheel for an aircraft of claim 1, wherein the number of air capturing structures on the hub cap is two.

3. The low skid device for a wheel for an aircraft of claim 1, wherein the hub cap comprises plastic, aluminum, steel, or fiber glass.

* * * * *